United States Patent
Kurosawa et al.

(10) Patent No.: US 10,071,601 B2
(45) Date of Patent: Sep. 11, 2018

(54) PNEUMATIC TIRE HAVING A ZIGZAG CENTER MAIN GROOVE AND SHOULDER OBLIQUE GROOVES

(71) Applicant: SUMITOMO RUBBER INDUSTRIES, LTD., Kobe-shi, Hyogo (JP)

(72) Inventors: Dai Kurosawa, Kobe (JP); Takuya Sato, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 204 days.

(21) Appl. No.: 14/920,372

(22) Filed: Oct. 22, 2015

(65) Prior Publication Data

US 2016/0129732 A1    May 12, 2016

(30) Foreign Application Priority Data

Nov. 6, 2014 (JP) .................................. 2014-226298
Nov. 20, 2014 (JP) .................................. 2014-235823

(51) Int. Cl.
  *B60C 11/11*    (2006.01)
  *B60C 11/12*    (2006.01)
  (Continued)

(52) U.S. Cl.
  CPC ...... *B60C 11/1236* (2013.01); *B60C 11/0306* (2013.01); *B60C 11/13* (2013.01);
  (Continued)

(58) Field of Classification Search
  CPC . B60C 11/00; B60C 11/0306; B60C 11/1236; B60C 11/13; B60C 11/12;
  (Continued)

(56) References Cited

U.S. PATENT DOCUMENTS

| 4,461,334 | A | * | 7/1984 | Tansei | ..................... | B60C 11/11 |
| | | | | | | 152/209.26 |
| 5,343,914 | A | * | 9/1994 | Wako | ..................... | B60C 11/11 |
| | | | | | | 152/209.18 |

(Continued)

FOREIGN PATENT DOCUMENTS

| EP | 1707405 A1 | 10/2006 |
| EP | 2821256 A1 | 1/2015 |

(Continued)

OTHER PUBLICATIONS

Suretsutohoo Aaron, JP 09058220, Mar. 4, 1997, machine translation.*

(Continued)

*Primary Examiner* — Robert C Dye
*Assistant Examiner* — Sedef Esra Ayalp Paquette
(74) *Attorney, Agent, or Firm* — Birch, Stewart, Kolasch & Birch, LLP

(57) ABSTRACT

Each shoulder land region 4E defined by a shoulder circumferential main groove 3E is provided with a circumferential narrow groove 20 and axially inner and outer shoulder oblique grooves 22 and 21 extending therefrom. The axially outer shoulder oblique grooves 21 are inclined with respect to the tire axial direction to one direction. The axially inner shoulder oblique grooves 22 are inclined with respect to the tire axial direction to one direction opposite to that of the axially outer shoulder oblique grooves 21. Crown oblique grooves 8 are inclined with respect to the tire axial direction to one direction same as that of the axially outer shoulder oblique grooves 21. Imaginary extensions 21K of the axially outer shoulder oblique grooves 21 are not overlapped with openings Q1 of the axially inner shoulder oblique grooves 22 at the circumferential narrow groove 20. Imaginary extensions 22K of the axially inner shoulder oblique grooves 22 are not overlapped with openings Q2 of the crown (Continued)

oblique grooves 8 at the shoulder circumferential main groove 3E, and are not overlapped with openings Q3 of the axially outer shoulder oblique grooves 21 at the circumferential narrow groove 20. Imaginary extensions 8K of the crown oblique grooves 8 are not overlapped with openings Q4 of the axially inner shoulder oblique grooves 22 at the shoulder circumferential main groove 3E.

15 Claims, 6 Drawing Sheets

(51) Int. Cl.
    *B60C 11/03*     (2006.01)
    *B60C 11/13*     (2006.01)

(52) U.S. Cl.
    CPC ............ *B60C 2011/0344* (2013.01); *B60C 2011/0346* (2013.01); *B60C 2011/0348* (2013.01); *B60C 2011/0372* (2013.01); *B60C 2011/0374* (2013.01); *B60C 2011/0395* (2013.01); *B60C 2011/1213* (2013.01); *B60C 2011/1254* (2013.01)

(58) Field of Classification Search
    CPC ..... B60C 2011/0344; B60C 2011/0346; B60C 2011/0348; B60C 2011/0372; B60C 2011/0374; B60C 11/0302; B60C 2011/0358
    USPC .................. 152/209, 209.1, 209.27
    See application file for complete search history.

(56) References Cited

U.S. PATENT DOCUMENTS

| 7,137,424 | B2 * | 11/2006 | Hino | B60C 11/0306 152/209.18 |
| 2003/0192634 | A1 | 10/2003 | Hino | |
| 2011/0259494 | A1 * | 10/2011 | Shibano | B60C 11/0306 152/209.22 |
| 2013/0192731 | A1 * | 8/2013 | Oji | B60C 11/0302 152/209.8 |
| 2014/0332133 | A1 * | 11/2014 | Atake | B60C 11/0083 152/209.15 |
| 2015/0251500 | A1 * | 9/2015 | Pokutta-Paskaleva | B60C 11/0306 152/209.25 |

FOREIGN PATENT DOCUMENTS

| JP | 09058220 A * | 3/1997 | |
| JP | 2007-118704 A | 5/2007 | |
| JP | 2009-190677 A | 8/2009 | |
| JP | 2013-189128 A | 9/2013 | |
| WO | WO-2013080944 A1 * | 6/2013 | B60C 11/0083 |

OTHER PUBLICATIONS

Extended European Search Report, dated Mar. 30, 2016, for European Application No. 15191054.4.

* cited by examiner

PNEUMATIC TIRE HAVING A ZIGZAG CENTER MAIN GROOVE AND SHOULDER OBLIQUE GROOVES

TECHNICAL FIELD

The present invention relates to a pneumatic tire, more particularly to a tread pattern capable of improving the lateral grip performance on snow covered roads.

BACKGROUND ART

Japanese Patent Application Publication No. 2013-189128 discloses a pneumatic tire provided in the tread portion with: two shoulder circumferential main grooves; a center circumferential main groove disposed therebetween; a middle circumferential sub groove disposed between the center circumferential main groove and each shoulder circumferential main groove; axially inner crown lateral grooves disposed in a part between the center circumferential main groove and each of the middle circumferential sub grooves to divide this part into axially inner crown blocks; axially outer crown lateral grooves disposed in a part between each of the shoulder circumferential main grooves and the adjacent middle circumferential sub groove to divide this part into axially outer crown blocks; and shoulder lateral grooves disposed in a part between each of the shoulder circumferential main grooves and the tread edge to divide this part into shoulder blocks.

On both sides of each shoulder circumferential main groove, the axially outer open ends of the axially outer crown lateral grooves are respectively aligned with the axially inner open ends of the shoulder lateral grooves. Thereby, when running on snowy road, crisscross compacted snow is formed in the shoulder circumferential main groove, the axially outer crown lateral groove and the shoulder lateral groove.

Such compacted snow provides a sharing force and helps to improve the snow performance of the tire.

But, in the case of the disclosed tire, the crisscross compacted snow is difficult to provide a large sharing force against a lateral force generated for example during cornering for the following reasons.

Since the axially outer open end of the axially outer crown lateral groove faces the axially inner open end of the shoulder lateral groove, the axially outer end of the compacted snow in the axially outer crown lateral groove and the axially inner end of the compacted snow in the shoulder lateral groove are not supported by groove walls and they support each other.

Therefore, although the sharing force in the tire axial direction, of the compacted snow in the shoulder circumferential main groove makes a contribution to the sharing force against the lateral force during cornering, the sharing force in the tire axial direction, of the compacted snow in the axially outer crown lateral groove, and the sharing force in the tire axial direction, of the compacted snow in the shoulder lateral groove can not make a contribution thereto.

As a result, it is difficult for the compacted snow to generate large lateral grip force, and the tire can not exert sufficient cornering performance on snow covered roads.

Thus, there is room for improvement in the cornering performance on snow covered roads.

SUMMARY OF THE INVENTION

Problems to be Resolved by the Invention

It is therefore, an object of the present invention to provide a pneumatic tire in which, by increasing the lateral grip force on snow covered road surface, the cornering performance is improved.

Means of Solving the Problems

According to the present invention, a pneumatic tire comprises a tread portion provided with a pair of shoulder circumferential main grooves disposed one on each side of the tire equator so that the tread portion is axially divided into a crown land region between the shoulder circumferential main grooves, and a pair of shoulder land regions between the shoulder circumferential main grooves and the tread edges, a circumferential narrow groove disposed in each of the shoulder land regions, axially outer shoulder oblique grooves disposed in each of the shoulder land regions and extending axially outwardly from the circumferential narrow groove beyond the tread edge while inclining with respect to the tire axial direction to one direction, axially inner shoulder oblique grooves disposed in each of the shoulder land regions and extending axially inwardly from the circumferential narrow groove beyond the shoulder circumferential main groove while inclining with respect to the tire axial direction to one direction opposite to that of the axially outer shoulder oblique grooves so as to have their axially inner ends terminated within the crown land region, crown oblique grooves extending from one of the shoulder circumferential main grooves to the other while inclining with respect to the tire axial direction to one direction same as that of the axially outer shoulder oblique grooves, wherein imaginary extensions of the axially outer shoulder oblique grooves are shifted in the tire circumferential direction from openings of the axially inner shoulder oblique grooves at the circumferential narrow groove so that the imaginary extensions do not overlap with the openings in the tire circumferential direction at the circumferential narrow groove, imaginary extensions of the axially inner shoulder oblique grooves are shifted in the tire circumferential direction from openings of the crown oblique grooves at the shoulder circumferential main groove so that the imaginary extensions do not overlap with the openings in the tire circumferential direction at the shoulder circumferential main groove, the imaginary extensions of the axially inner shoulder oblique grooves are shifted in the tire circumferential direction from openings of the axially outer shoulder oblique grooves at the circumferential narrow groove so that the imaginary extensions do not overlap with the openings in the tire circumferential direction at the circumferential narrow groove, imaginary extensions of the crown oblique grooves are shifted in the tire circumferential direction from openings of the axially inner shoulder oblique grooves at the shoulder circumferential main groove so that the imaginary extensions do not overlap with the openings in the tire circumferential direction at the shoulder circumferential main groove.

In the pneumatic tire according to the present invention, it is preferable that the angle θa of the axially outer shoulder oblique grooves with respect to the tire axial direction is 15 to 30 degrees,
the angle θb of the axially inner shoulder oblique grooves with respect to the tire axial direction is 15 to 30 degrees, and
the angle θc of the crown oblique grooves with respect to the tire axial direction is 15 to 35 degrees.

In the pneumatic tire according to the present invention, it is preferable that the crown land region is provided with sipes inclined with respect to the tire axial direction to one direction opposite to that of the crown oblique grooves.

In the pneumatic tire according to the present invention, it is preferable that the crown land region is provided with a center circumferential main groove extending circumferentially of the tire to axially divide each of the crown oblique grooves into two lateral groove parts,
the center circumferential main groove is a zigzag groove composed of alternate lateral groove segments and longitudinal groove segments,
the lateral groove segments having lateral groove walls extending at an angle α of not more than 5 degrees with respect to the tire axial direction,
the longitudinal groove segments having longitudinal groove walls extending at an angle β of not less than 60 degrees with respect to the tire axial direction,
the above-mentioned two lateral groove parts of each crown oblique groove are respectively connected to the axial ends of one of the lateral groove segments, whereby the crown oblique groove extends from one of the shoulder circumferential main grooves to the other through the lateral groove segment.

In the pneumatic tire according to the present invention, it is preferable that the lateral groove walls has a length L1 in the tire axial direction of 2% to 10% of the tread width TW.

In the pneumatic tire according to the present invention, it is preferable that the ratio W2/W1 of the groove width W2 of the lateral groove segments to the groove width W1 of the longitudinal groove segments is 0.8 to 2.0.

In the pneumatic tire according to the present invention, it is preferable that the longitudinal groove segments are inclined with respect to the tire axial direction to one direction same as that of the crown oblique grooves.

In the pneumatic tire according to the present invention, it is preferable that each of the shoulder circumferential main grooves is a straight groove.

In the pneumatic tire according to the present invention, it is preferable that the crown land region is divided into crown blocks in two rows by the center circumferential main groove and the crown oblique grooves, and
the crown blocks are each provided with sipes inclined with respect to the tire axial direction to one direction opposite to that of the crown oblique grooves.

In the pneumatic tire according to the present invention, it is preferable that the angle β of the longitudinal groove walls is not less than 75 degrees, and
the angle θc of the crown oblique grooves with respect to the tire axial direction is 15 to 35 degrees.

According to the present invention, therefore, during running on snowy roads, the axially inner end of compacted snow in the axially outer shoulder oblique groove is pressed against and supported by the axially inner sidewall of the circumferential narrow groove.

The axially outer end of compacted snow in the axially inner shoulder oblique groove is pressed against and supported by the axially outer sidewall of the circumferential narrow groove.
The axially inner end of compacted snow in the axially inner shoulder oblique groove is pressed against and supported by the crown land region.
Both ends of compacted snow in the crown oblique groove are pressed against and supported by the axially outer sidewalls of the shoulder circumferential main grooves.
As a result, the compacted snow in the above-mentioned oblique grooves can exert increased sharing force in the tire axial direction, and the lateral grip force of the tire is increased to improve the cornering performance on snowy roads.

Further, since the axially outer shoulder oblique grooves are inclined oppositely to the axially inner shoulder oblique grooves which are inclined oppositely to the crown oblique grooves, the tread pattern rigidity becomes even, and it becomes possible to increase the lateral grip force without largely deteriorating the wear resistance of the tread portion.

Definitions

The tread width TW is the width measured under a normally inflated unloaded condition of the tire, as the axial distance between the tread edges Te.
The tread edges Te are the axial outermost edges of the ground contacting patch of the tire which occurs under a normally inflated loaded condition when the camber angle of the tire is zero.
The normally inflated unloaded condition is such that the tire is mounted on a standard wheel rim and inflate to a standard pressure but loaded with no tire load.
The normally inflated loaded condition is such that the tire is mounted on the standard wheel rim and inflated to the standard pressure and loaded with the standard tire load.
The standard wheel rim is a wheel rim officially approved or recommended for the tire by standards organizations, i.e. JATMA (Japan and Asia), T&RA (North America), ETRTO (Europe), TRAA (Australia),STRO (Scandinavia), ALAPA (Latin America), ITTAC (India) and the like which are effective in the area where the tire is manufactured, sold or used.
The standard pressure and the standard tire load are the maximum air pressure and the maximum tire load for the tire specified by the same organization in the Air-pressure/Maximum-load Table or similar list.
For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

DESCRIPTION OF THE PREFERRED EMBODIMENTS

Embodiments of present invention will now be described in detail in conjunction with accompanying drawings.

Figure 1:
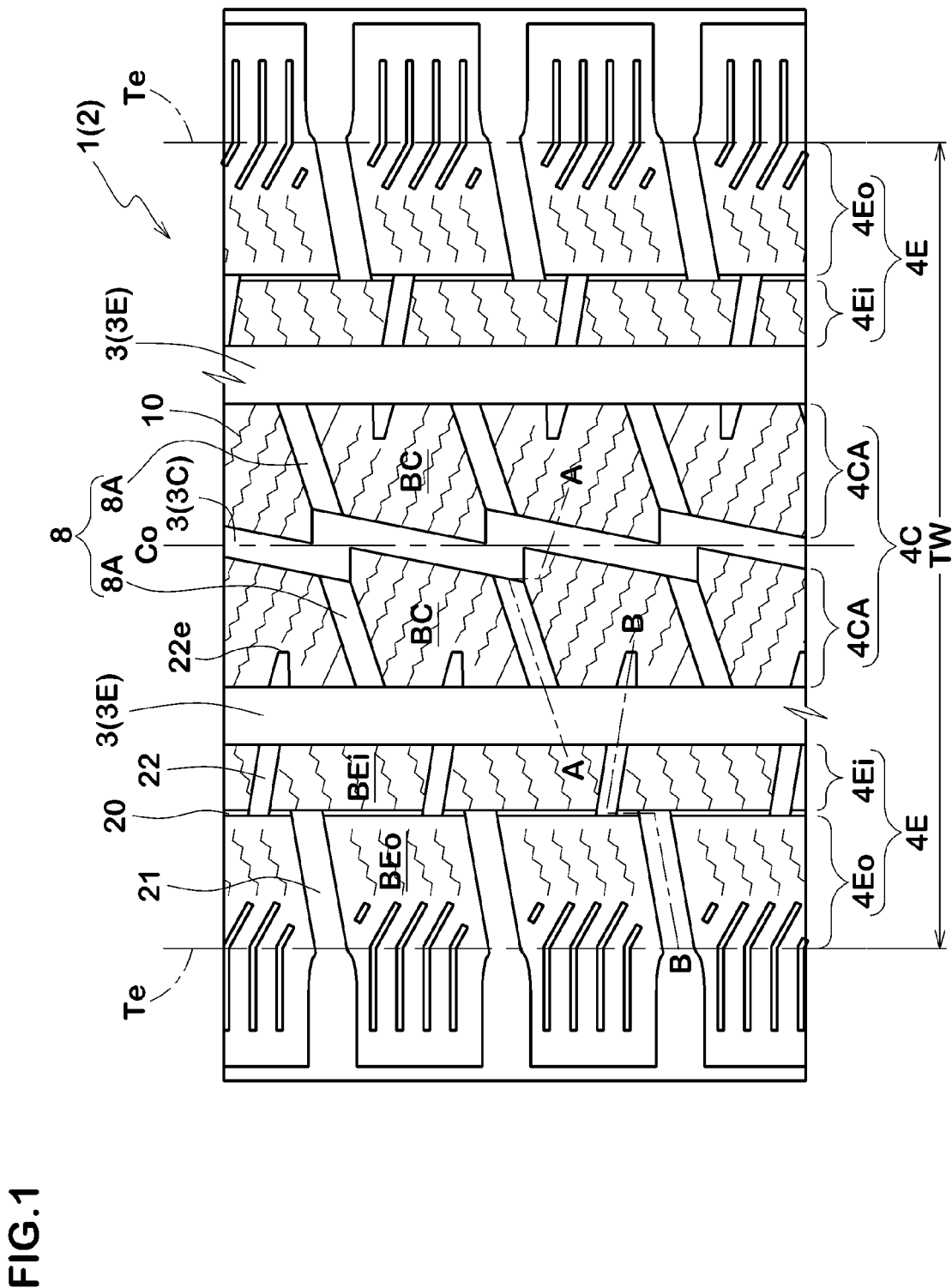
FIG. 1 is a developed partial view of the tread portion of a pneumatic tire as an embodiment of the present invention.

As shown in FIG. 1, pneumatic tire 1 according to the present invention is provided in the tread portion 2 with circumferential main grooves 3 extending circumferentially of the tire and including a pair of axially outermost shoulder circumferential main grooves 3E.
Thereby, the tread portion 2 is axially divided into a crown land region 4C between the shoulder circumferential main grooves 3E, and a pair of shoulder land regions 4E between the shoulder circumferential main grooves 3E and the tread edges Te.

Here, the term "main groove" means a relatively wide groove having a width of not less than 3.0 mm. A groove having a width of less than 3.0 mm is called "narrow groove". A groove having a width of less than 2.0 mm (inclusive of a cut having substantially no groove width) is called "sipe".

The crown land region 4C is provided with crown oblique grooves 8 extending from one of the shoulder circumferential main grooves 3E to the other, while inclining with respect to the tire axial direction.

Each of the shoulder land regions 4E is provided with
a circumferential narrow groove 20 extending circumferentially of the tire,
axially outer shoulder oblique grooves 21 extending axially outwardly from the circumferential narrow groove 20 beyond the tread edge Te, and
axially inner shoulder oblique grooves 22 extending axially inwardly from the circumferential narrow groove 20 beyond the shoulder circumferential main groove 3E.

By the circumferential narrow groove 20, the shoulder land region 4E is axially divided into an axial inner part 4Ei and an axially outer part 4Eo.
The axially inner part 4Ei is circumferentially divided by the axially inner shoulder oblique grooves 22 into a plurality of axially inner shoulder blocks BEi.
The axially outer part 4Eo is circumferentially divided by the axially outer shoulder oblique grooves 21 into a plurality of axially outer shoulder blocks BEo.

The axially outer shoulder oblique grooves 21 are inclined with respect to the tire axial direction to one direction same as that of the crown oblique grooves 8.
The axially inner shoulder oblique grooves 22 are inclined with respect to the tire axial direction to one direction opposite to that of the axially outer shoulder oblique grooves 21.

The axially inner ends 22e of the axially inner shoulder oblique grooves 22 are terminated within the crown land region 4C.

In this embodiment, the axially outer shoulder oblique grooves 21 and the axially inner shoulder oblique grooves 22 extend straight along the respective entire lengths.

Figure 5:
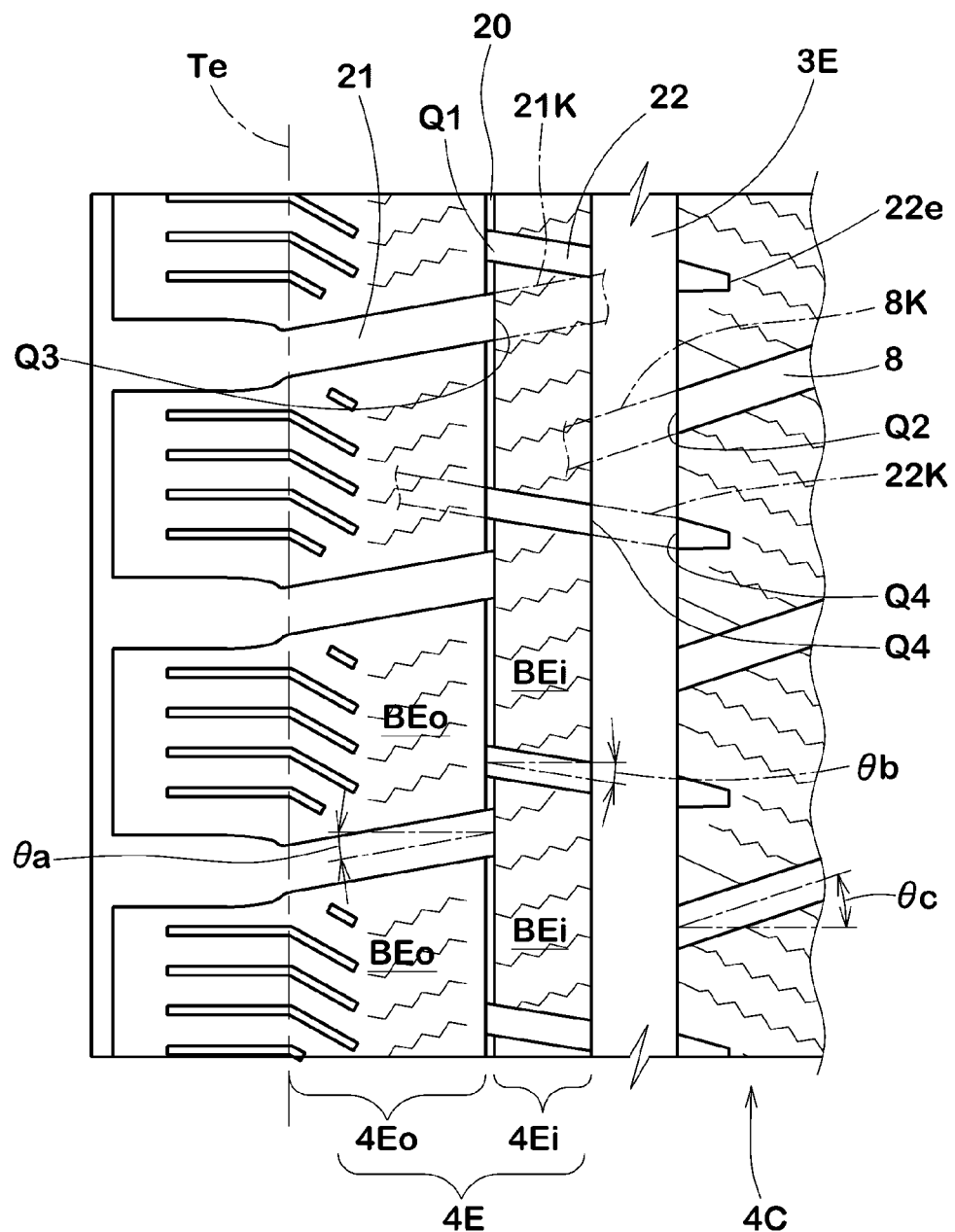
FIG. 5 is a developed partial view showing the shoulder land region of the tread portion shown in FIG. 1.

As shown in FIG. 5, imaginary axially inward extensions 21K of the axially outer shoulder oblique grooves 21 are shifted in the tire circumferential direction from the openings Q1 of the axially inner shoulder oblique grooves 22 at the circumferential narrow groove 20 not to overlap with the openings Q1.
Further, imaginary axially inward extensions 22K of the axially inner shoulder oblique grooves 22 are shifted in the tire circumferential direction from the openings Q2 of the crown oblique grooves 8 at the shoulder circumferential main groove 3E not to overlap with the openings Q2, and imaginary axially outward extensions 22K of the axially inner shoulder oblique grooves 22 are shifted in the tire circumferential direction from the openings Q3 of the axially outer shoulder oblique grooves 21 at the circumferential narrow groove 20 not to overlap with the openings Q3.
Furthermore, imaginary axially outward extensions 8K of the crown oblique grooves 8 are shifted in the tire circumferential direction from the openings Q4 of the axially inner shoulder oblique grooves 22 at the shoulder circumferential main groove 3E not to overlap with the openings Q4.

Figure 6:
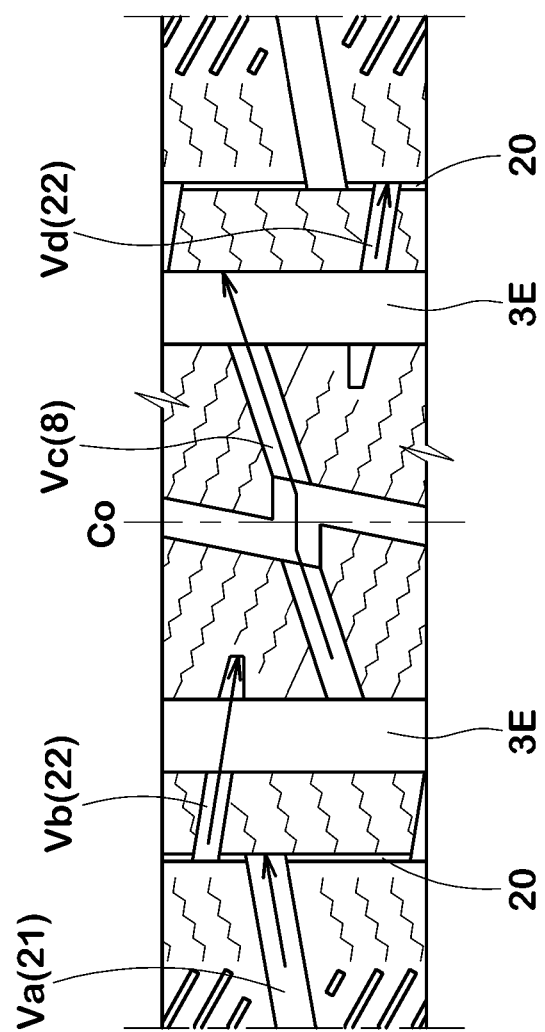
FIG. 6 is a diagram for explaining the operation and effect of the axially inner and outer shoulder oblique grooves and the crown oblique grooves.

Therefore, during cornering on snowy road, for example as shown in FIG. 6, an axially inner end of the compacted snow Va in the axially outer shoulder oblique groove 21 on one side of the tire equator (on the left side in the figure) is pressed against and supported by the axial inner groove wall of the circumferential narrow groove 20; an axially end of the compacted snow Vb in the axially inner shoulder oblique groove 22 on one side of the tire equator (on the left side in the figure) is pressed against and supported by the crown land region 4c; an end of the compacted snow Vc in the crown oblique grooves 8 is pressed against and supported by the axially outer groove wall of the shoulder circumferential main groove 3E; and an axially outer end of the compacted snow Vd in the axially inner shoulder oblique groove 22 on the other side of the tire equator (on the right side in the figure) is pressed against and supported by the axially outer groove wall of the circumferential narrow groove 20. Therefore, each compacted snow Va to Vd exerts its increased sharing force in the groove's length direction or the tire axial direction. Thereby, the lateral grip force is increased, and the cornering performance on snowy roads can be improved.

Further, the axially outer shoulder oblique grooves 21 are inclined oppositely to the axially inner shoulder oblique grooves 22 which are inclined oppositely to the crown oblique grooves 8. Namely, the axially adjacent oblique lateral grooves are inclined oppositely to each other.
Therefore, the tread pattern rigidity becomes hard to be biased, and it becomes possible to increase the lateral grip force without largely deteriorating the wear resistance.

As shown in FIG. 5, the angle $\theta a$ of the axially outer shoulder oblique grooves 21 with respect to the tire axial direction is preferably set in a range of 15 to 30 degrees, the angle $\theta b$ of the axially inner shoulder oblique grooves 22 with respect to the tire axial direction is preferably set in a range of 15 to 30 degrees, and
the angle $\theta c$ of the crown oblique grooves 8 with respect to the tire axial direction is preferably set in a range of 15 to 35 degrees.

If the angles $\theta a$ to $\theta c$ become less than the respective lower limits, then the lateral grip force during cornering is decreased, and the effect to improve the cornering performance on snowy roads is decreased.

If the angles θa to θc become more than the respective upper limits, then although the lateral grip force is increased, as the tread pattern rigidity is biased, the uneven wear resistance is liable to decrease.

Figure 7A:
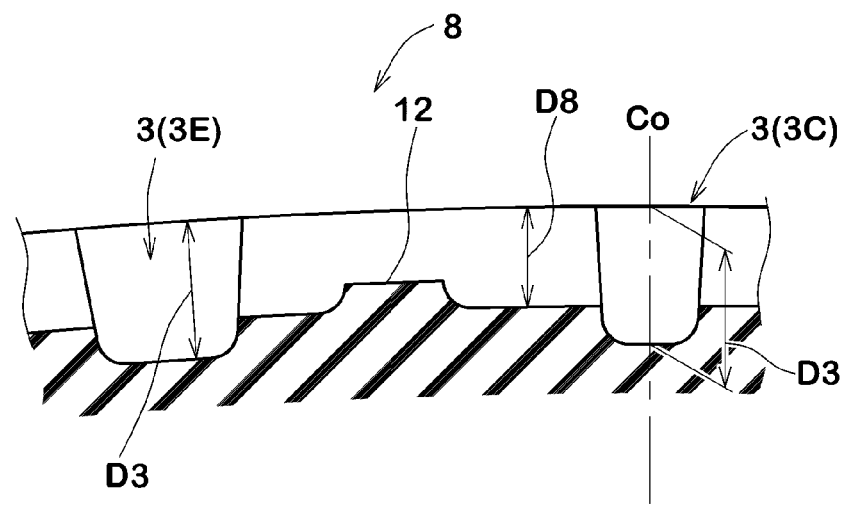
FIG. 7(A) is a cross sectional view taken along line A-A in FIG. 1.

As shown in FIG. 7(A), the depth D3 of the circumferential main grooves 3 is not less than 6.5 mm, preferably not less than 7.5 mm, but not more than 13.0 mm, preferably not more than 12.5 mm.
In this example, all of the circumferential main grooves 3 have the same depth D3.
Preferably, the depth D8 of the crown oblique grooves 8 is less than the depth D3. In this example, the depth D8 is set in a range of 60% to 80% of the depth D3.

Each of the crown oblique grooves 8 may be provided with a tie bar 12 rising from the groove bottom and connecting between the circumferentially adjacent crown blocks to increase the rigidity of the crown blocks.

Figure 7B:
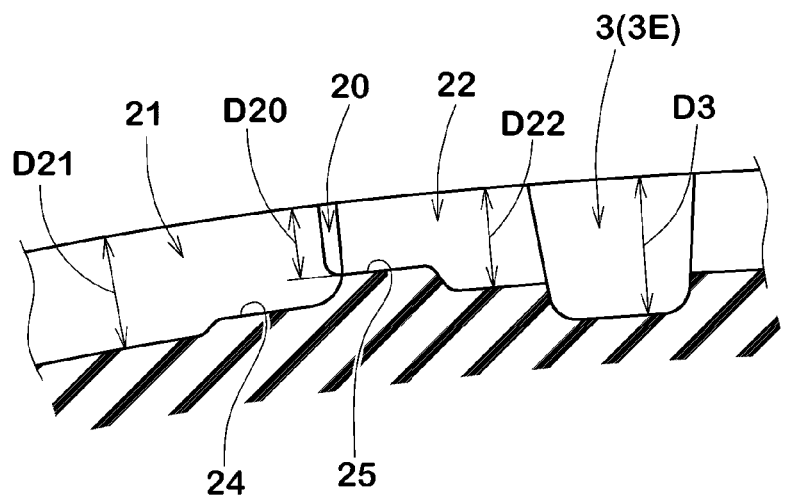
FIG. 7(B) is a cross sectional view taken along line B-B in FIG. 1.

It is preferable that, as shown in FIG. 7(B), the depths D21 and D22 of axially outer and inner shoulder oblique grooves 21 and 22 are less than the depth D3.
In this example, the depths D21 and D22 are set in a range of the 60% to 80% of the depth D3.
Each of the axially outer shoulder oblique grooves 21 may be provided with a tie bar 24 similar to the tie bar 12.
Each of the axially inner shoulder oblique grooves 22 may be provided with a tie bar 25 similar to the tie bar 12.
The depth D20 of the circumferential narrow grooves 20 is preferably less than the depth D3 and less than the depths D21 and D22.

Figure 2:
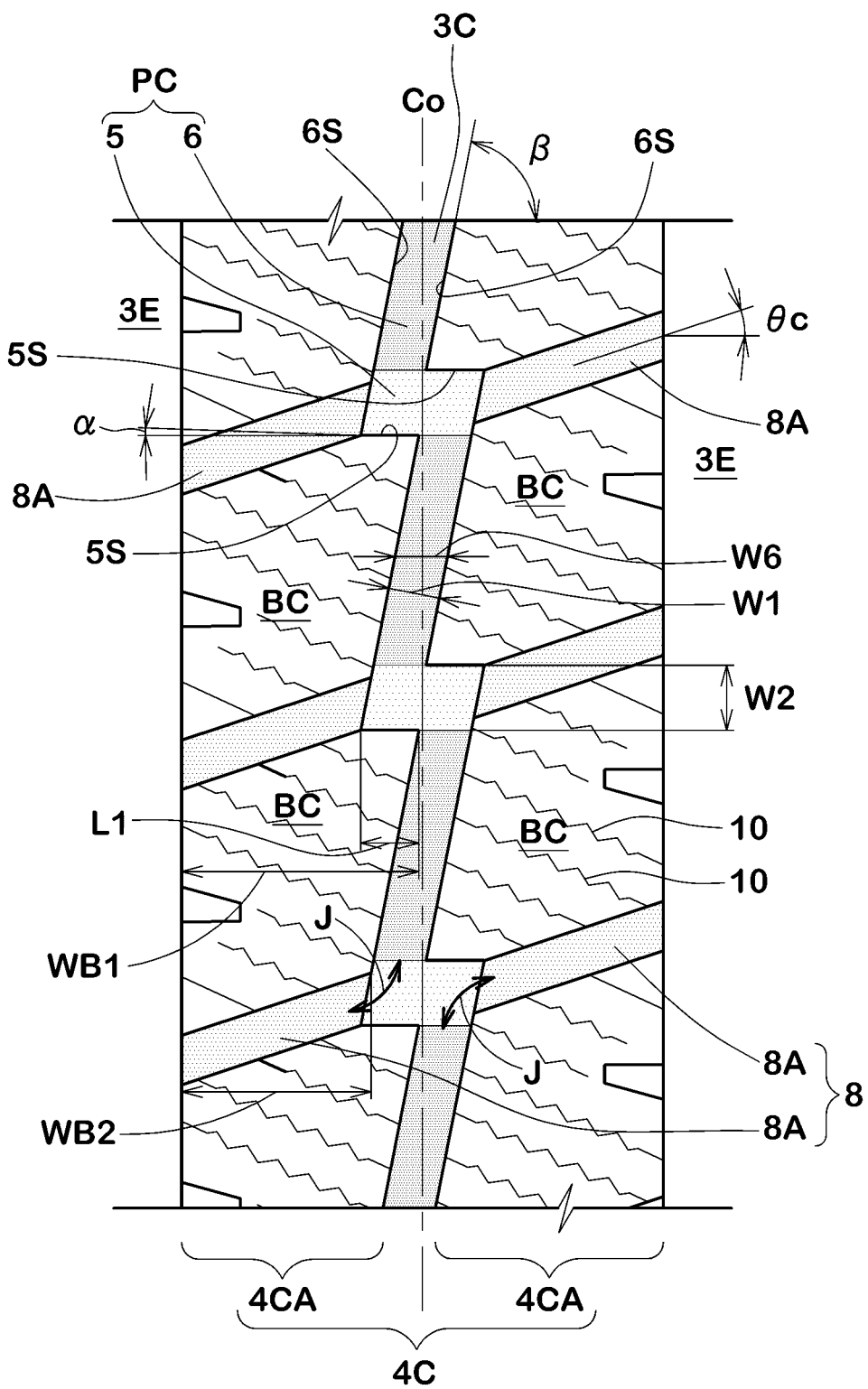
FIG. 2 is a developed partial view showing the crown land region thereof.

In this example, as shown in FIG. 2, the crown land region 4C is provided with a center circumferential main groove 3C extending circumferentially of the tire.
Thereby, the crown land region 4C is axially divided into two parts 4CA and 4CA each of which is circumferentially divided into crown blocks BC in a circumferential row.
Further, the crown oblique grooves 8 are each axially divided into two lateral groove parts 8A and 8A.
The lateral groove parts 8A of the crown oblique grooves 8 extend straight along the respective entire lengths.
The above-mentioned imaginary extensions 8K of each crown oblique groove 8 are two axially outward extensions from the respective lateral groove parts 8A.

In this example, the center circumferential main groove 3C is a saw-tooth like zigzag groove made up of alternate lateral groove segments 5 and longitudinal groove segments 6. The lateral groove segments 5 extend substantially parallel with the tire axial direction. The longitudinal groove segments 6 extend at a small angle with respect to the tire circumferential direction.
The lateral groove segments 5 are distinguished from the longitudinal groove segments 6 as shown in FIG. 2 by dark and light gray.
In this example, the zigzag amplitude center line of the center circumferential main groove 3C coincides with the tire equator Co. But, it may be possible that the zigzag amplitude center line does not coincide with the tire equator Co, or the center circumferential main groove 3C is separated from the tire equator Co.

The opposite groove walls 5S of the lateral groove segment 5 (hereinafter, the "lateral groove walls" 5S) extend at an angle α of not more than 5 degrees with respect to the tire axial direction.

The opposite groove walls 6S of the longitudinal groove segment 6 (hereinafter, the "longitudinal groove walls" 6S) extend at an angle β of not less than 60 degrees with respect to the tire axial direction.
One lateral groove segment 5 and one longitudinal groove segment 6 as one unit PC are repeated circumferentially of the tire.
In this example, the axial ends of each of the lateral groove segments 5 are connected to the axially inner ends of two of the lateral groove parts 8A disposed on both sides thereof.

Figure 3:
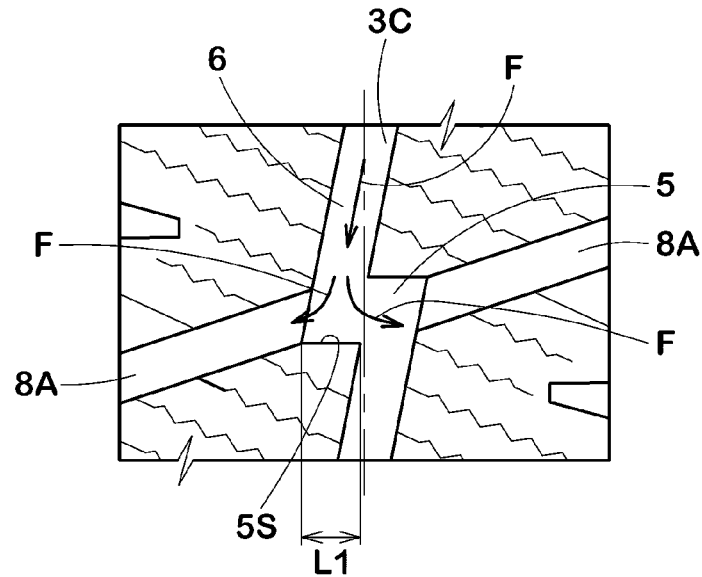
FIG. 3 is a diagram for explaining the operation and effect of the center circumferential main groove.

Meanwhile, the crown land region 4C is such a region where the ground contacting pressure is relatively high and whose ground contacting length in the tire circumferential direction is relatively long. Accordingly, its effect on the snow performance is large.
Therefore, in this example, the saw-tooth like center circumferential main groove 3C and the crown oblique grooves 8 are disposed in this region in order to maximally derive the undermentioned effects, and thereby to further improve the snow performance.
First, by inclining the lateral groove walls 5S at the angle α of not more than 5 degrees, the center circumferential main groove 3C can most effectively contribute to the traction performance in relation to the zigzag amplitude.
When snow in the center circumferential main groove 3C is compacted during running on snowy road, as shown in FIG. 3, snow in the longitudinal groove segment 6 is stopped by the lateral groove wall 5S and compressed at the lateral groove wall 5S.
And this compression force F is transmitted to snow in the lateral groove segment 5.
Since both ends of the lateral groove segment 5 are connected to the lateral groove parts 8A, the compression force F is transmitted to snow in the lateral groove parts 8A through the snow in the lateral groove segment 5.
As a result, the snow in the longitudinal groove segment 6, the snow in the lateral groove segment 5, and the snow in the lateral groove parts 8A are compacted and form a substantially T-shaped hard compacted snow together.
Such compacted snow therefore can exert large sharing force in both of the tire circumferential direction and the tire axial direction, and the grip performance on snowy roads is improved.
Thus, it is possible to further improve the snow performance including the cornering performance.
From this standpoint, it is preferable that the length L1 in the tire axial direction of the lateral groove walls 5S as shown in FIG. 2 is in a range of from 2% to 10% of the tread width TW. If the length L1 is less than 2% of the tread width TW, the lateral groove wall 5S can not stop the snow in the longitudinal groove segment 6, and the compression force F is reduced or not generated, and accordingly, the hard compacted snow can not be formed.
Even if the length L1 is increased over 10% of the tread width TW, a further increase in the sharing force of the compacted snow can not be obtained.
In addition, the rigidity of the crown blocks BC is decreased disadvantageously for the wear resistance and the uneven wear resistance because the zigzag amplitude increases with the increase in the length L1, and as a result, a maximum WB1 of the axial width of the crown block BC is increased and a minimum WB2 thereof is decreased. Namely, the rigidity of the crown block BC becomes more uneven. Thus, the wear resistance and the uneven wear resistance are deteriorated.
From this viewpoint, it is desirable that the length L1 is not less than 4%, but not more than 8% of the tread width TW. From a point of view of the wear resistance and the uneven wear resistance, it is desirable that the angle β of the longitudinal groove walls 6S is not less than 75 degrees.

In order to fully stop the snow in the longitudinal groove segment 6, the length L1 is preferably not less than the width W6 in the tire axial direction of the longitudinal groove segment 6.

Preferably, the ratio W2/W1 of the groove width W2 of the lateral groove segment 5 to the groove width W1 of the longitudinal groove segment 6 is set in a range of from 0.8 to 2.0.

The groove width W1 is the distance between the lateral groove walls 5S of the lateral groove segment 5 measured perpendicularly to the groove's length direction.

The groove width W2 is the distance between the longitudinal groove walls 6S of the longitudinal groove segment 6 measured perpendicularly to the groove's length direction.

If the ratio W2/W1 becomes outside the above-mentioned range, the thicknesses of the compacted snows become imbalanced, and there is a tendency such that the strength is decreased and the compacted snow's sharing force is decreased.

Further, there is a possibility that the width of the center circumferential main groove 3C is partially decreased to deteriorate the drainage.

Figure 4:
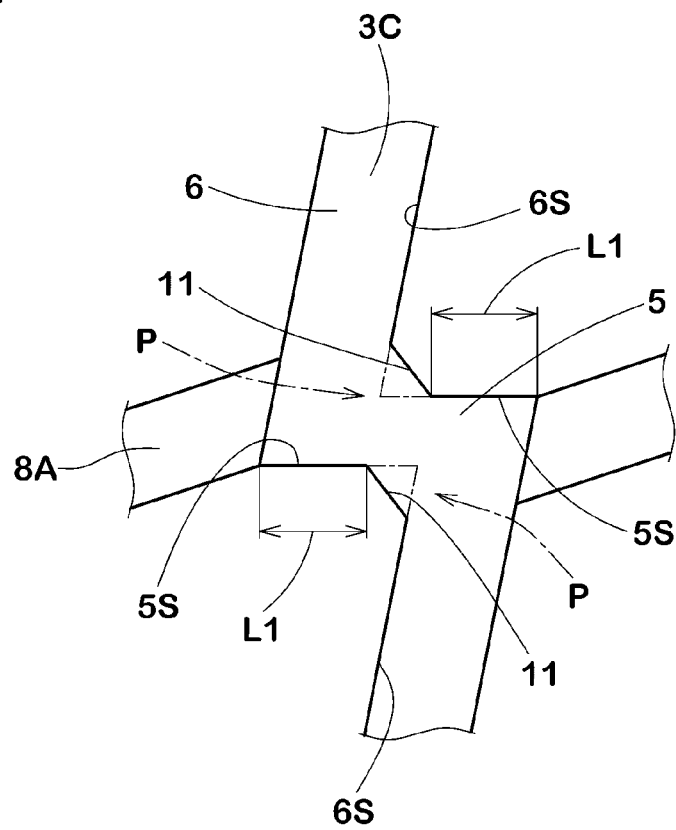
FIG. 4 shows another example of the center circumferential main groove.

As shown in FIG. 4, the center circumferential main groove 3C may be provided with a chamfer 11 in each external corner P formed between the lateral groove wall 5S and the longitudinal groove wall 6S.

In this case, the length L1 of the lateral groove wall 5S is defined by the length of the lateral groove wall 5S excluding the chamfer 11.

It is preferable that the lateral groove parts 8A are inclined with respect to the tire axial direction to one direction same as that of the longitudinal groove segments 6. In FIG. 2, the lateral groove parts 8A and the longitudinal groove segments 6 in this example are inclined upward to the right.

By inclining to the same direction as explained above, water flows J between the lateral groove parts 8A and the longitudinal groove segments 6 (shown in FIG. 2) are expedited, and the drainage performance can be improved.

The crown blocks BC are provided with sipes 10.

The sipes 10 are inclined with respect to the tire axial direction to one direction opposite to that of the lateral groove parts 8A.

In FIG. 2, the sipes 10 in this example are inclined downward to the right whereas the lateral groove parts 8A are inclined upward to the right.

By oppositely orienting as explained above, deformation of the crown blocks BC is facilitated, and snow in the lateral groove parts 8A is moved and compressed toward the lateral groove segments 5. As a result, the snow is compacted near the junctions of the lateral groove parts 8A and the lateral groove segments 5, and the strength of the compacted snow is increased. Further, the sipes 10 improve the ice performance and snow performance of the tire by their edge effect.

In this example, the shoulder circumferential main grooves 3E extend straight in the tire circumferential direction. Thereby, the drainage and the self ejection of snow are improved. Further, the straight running stability is improved during running on snowy roads.

Comparison Test 1

Based on the tread pattern shown in FIG. 1, studless tires of size 205/65R16 (rim size 16×6.5J) were experimentally manufactured, changing the specifications of the axially inner and outer shoulder oblique grooves, the crown oblique grooves, the center circumferential main groove, and the sipes as listed in Table 1. Otherwise, all of the tires had substantially the same specifications.

The tire were tested for the snow performance and wear resistance as follows.

<Cornering Performance on Snow>

The test tires were mounted on all of the four wheels of a medium-sized van (Engine displacement 2800 cc, front tire pressure 390 kPa, rear tire pressure 350 kPa, load 50% of maximum load), and a test driver evaluated the lateral grip force during running on a snow covered road surface of a tire test course. The results are indicated in Table 1 by an index based on Comparative example tire Ref.1 being 100, wherein the larger the index number, the higher the lateral grip force, namely, the better the cornering performance on snow.

<Wear Resistance>

Using the above-mentioned test vehicle, after running for 30000 km on a dry road surface of a tire test course, the amount of tread wear was measured. The results are indicated in Table 1 by an index based on Comparative example tire Ref.1 being 100, wherein the larger the index number, the better the wear resistance.

Comparison Test 2

Based on the tread pattern shown in FIG. 1, studless tires of size 205/65R16 (rim size 16×6.5J) were experimentally manufactured, changing the specifications of the center circumferential main groove, the crown oblique grooves, and the sipes as listed in Table 2. Otherwise, all of the tires had substantially the same specifications.

The tire were tested for the snow performance as above and the wet performance as follows. The results of the snow performance test are indicated in Table 2.

<Wet Performance>

Using the above-mentioned test vehicle, the test driver evaluated the steering stability during running on a wet road surface of the tire test course. The results are indicated in Table 2 by an index based on Comparative example tire Ref.A1 being 100, wherein the larger the index number, the better the wet performance.

As shown in Table 1 and Table 2, the working example tires were improved in the cornering performance on snow.

TABLE 1

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|
| axially outer shoulder oblique grooves | | | | | | | | | | | | |
| angle θa (deg.) *1 | +15 | +25 | +25 | +25 | +5 | +15 | +25 | +30 | +35 | +25 | +25 | +25 |
| axially inner shoulder oblique grooves | | | | | | | | | | | | |
| angle θb (deg.) *1 | +15 | −25 | −25 | −25 | −25 | −25 | −25 | −25 | −25 | −5 | −15 | −25 |
| crown oblique grooves | | | | | | | | | | | | |
| angle θc (deg.) *1 | +15 | +30 | +30 | +30 | +30 | +30 | +30 | +30 | +30 | +30 | +30 | +30 |

TABLE 1-continued

| (O)verlap or (N)ot | | | | | | | | | | | | |
|---|---|---|---|---|---|---|---|---|---|---|---|---|
| imaginary extension 21K & opening Q1 | N | O | N | N | N | N | N | N | N | N | N | N |
| imaginary extension 22K & opening Q3 | N | N | O | N | N | N | N | N | N | N | N | N |
| imaginary extension 8K & opening Q4 | N | N | N | O | N | N | N | N | N | N | N | N |
| center sipes' inclining direction *2 | | | | opposite | | | | | | | | |
| center circumferential main groove | | | | | | | | | | | | |
| lateral groove segment angle α (deg.) | 0 | 0 | 0 | 0 | 0 | 0 | 0 | 0 | 0 | 0 | 0 | 0 |
| longitudinal groove segment angle β (deg.) | 78 | 78 | 78 | 78 | 78 | 78 | 78 | 78 | 78 | 78 | 78 | 78 |
| cornering performance on snow | 100 | 95 | 98 | 95 | 110 | 120 | 130 | 120 | 120 | 110 | 120 | 130 |
| wear resistance | 100 | 100 | 100 | 100 | 100 | 100 | 100 | 100 | 90 | 100 | 100 | 100 |
| Total | 200 | 195 | 198 | 195 | 210 | 220 | 230 | 220 | 210 | 210 | 220 | 230 |

| Tire | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| axially outer shoulder oblique grooves | | | | | | | | | | | |
| angle θa (deg.) *1 | +25 | +25 | +25 | +25 | +25 | +25 | +25 | +25 | +25 | +25 | +25 |
| axially inner shoulder oblique grooves | | | | | | | | | | | |
| angle θb (deg.) *1 | −30 | −35 | −25 | −25 | −25 | −25 | −25 | −25 | −25 | −25 | −25 |
| crown oblique grooves | | | | | | | | | | | |
| angle θc (deg.) *1 | +30 | +30 | +5 | +15 | +25 | +30 | +35 | +25 | +30 | +30 | +30 |
| (O)verlap or (N)ot | | | | | | | | | | | |
| imaginary extension 21K & opening Q1 | N | N | N | N | N | N | N | N | N | N | N |
| imaginary extension 22K & opening Q3 | N | N | N | N | N | N | N | N | N | N | N |
| imaginary extension 8K & opening Q4 | N | N | N | N | N | N | N | N | N | N | N |
| center sipes' inclining direction *2 | | | | | opposite | | | | same | opposite | opposite |
| center circumferential main groove | | | | | | | | | | | |
| lateral groove segment angle α (deg.) | 0 | 0 | 0 | 0 | 0 | 0 | 0 | 0 | 0 | 5 | 0 |
| longitudinal groove segment angle β (deg.) | 78 | 78 | 78 | 78 | 78 | 78 | 78 | 78 | 78 | 78 | 60 |
| cornering performance on snow | 120 | 120 | 110 | 120 | 130 | 125 | 120 | 120 | 125 | 125 | 120 |
| wear resistance | 100 | 90 | 100 | 100 | 100 | 100 | 100 | 90 | 100 | 100 | 100 |
| Total | 220 | 210 | 210 | 220 | 230 | 225 | 220 | 210 | 225 | 225 | 220 |

*1 + (plus sign): inclined upward to the right
− (minus sign): inclined downward to the right
*2 "opposite": inclined to the opposite direction to the crown oblique grooves
"same": inclined to the same direction as the crown oblique grooves

TABLE 2

| Tire | Ref. A1 | Ex. A1 | Ex. A2 | Ex. A3 | Ref. A2 | Ex. A4 | Ref. A3 | Ex. A5 |
|---|---|---|---|---|---|---|---|---|
| center circumferential main groove | | | | | | | | |
| lateral groove segment angle α (deg.) | 0 | 0 | 0 | 0 | 0 | 5 | 10 | 0 |
| longitudinal groove segment angle β (deg.) | 78 | 78 | 78 | 78 | 78 | 78 | 78 | 78 |
| length ratio L1/TW(%) | 1 | 2 | 4 | 10 | 15 | 4 | 4 | 4 |
| groove width ratio W2/W1 | 1 | 1 | 1 | 1 | 1 | 1 | 1 | 0.5 |
| inclination | | | | | | | | |
| crown oblique grooves and longitudinal groove segments | same | same | same | same | same | same | same | same |
| crown oblique grooves and sipes | opposite | opposite | opposite | opposite | opposite | opposite | opposite | opposite |
| crown oblique groove angle θc (deg.) | 30 | 30 | 30 | 30 | 30 | 30 | 30 | 30 |
| snow performance | 100 | 108 | 115 | 120 | 110 | 110 | 102 | 108 |
| wet performance | 100 | 100 | 98 | 95 | 86 | 100 | 95 | 94 |
| total | 200 | 208 | 213 | 215 | 196 | 210 | 197 | 202 |

| Tire | Ex. A6 | Ex. A7 | Ex. A8 | Ex. A9 | Ex. A10 | Ex. A11 | Ex. A12 | Ex. A13 |
|---|---|---|---|---|---|---|---|---|
| center circumferential main groove | | | | | | | | |
| lateral groove segment angle α (deg.) | 0 | 0 | 0 | 0 | 0 | 0 | 0 | 0 |
| longitudinal groove segment angle β (deg.) | 78 | 78 | 78 | 78 | 60 | 78 | 78 | 78 |
| length ratio L1/TW(%) | 4 | 4 | 4 | 4 | 4 | 4 | 4 | 4 |
| groove width ratio W2/W1 | 0.8 | 2 | 2.5 | 1 | 1 | 1 | 1 | 1 |
| inclination | | | | | | | | |

TABLE 2-continued

| | | | | | | | | |
|---|---|---|---|---|---|---|---|---|
| crown oblique grooves and longitudinal groove segments | same | same | same | opposite | same | same | same | same |
| crown oblique grooves and sipes | opposite | opposite | opposite | opposite | same | opposite | opposite | opposite |
| crown oblique groove angle θc (deg.) | 30 | 30 | 30 | 30 | 30 | 30 | 15 | 35 |
| snow performance | 110 | 110 | 105 | 115 | 112 | 110 | 115 | 110 |
| wet performance | 98 | 102 | 105 | 95 | 98 | 98 | 92 | 98 |
| total | 208 | 212 | 210 | 210 | 210 | 208 | 207 | 208 |

REFERENCE SIGNS LIST 1 pneumatic tire
2 tread portion
3C center circumferential main groove
3E shoulder circumferential main groove
4C crown land region
4E shoulder land region
5 lateral groove segment
5S lateral groove wall
6 longitudinal groove segment
6S longitudinal groove wall
8 crown oblique groove
8K imaginary extension
10 sipe
20 circumferential narrow groove
21 axially outer shoulder oblique groove
22e inner end
22 axially inner shoulder oblique groove
21K imaginary extension
22K imaginary extension
BC crown block
Co tire equator
Q1, Q2, Q3, Q4 opening

The invention claimed is:

1. A pneumatic studless tire having a number of sipes, wherein a tread portion is provided with
   a pair of shoulder circumferential main grooves disposed one on each side of the tire equator so that the tread portion is axially divided into a crown land region between the shoulder circumferential main grooves, and a pair of shoulder land regions between the shoulder circumferential main grooves and the tread edges,
   a circumferential narrow groove disposed in each of the shoulder land regions,
   axially outer shoulder oblique grooves disposed in each of the shoulder land regions and extending axially outwardly from the circumferential narrow groove beyond the tread edge while inclining with respect to the tire axial direction to one direction,
   axially inner shoulder oblique grooves disposed in each of the shoulder land regions and extending axially inwardly from the circumferential narrow groove beyond the shoulder circumferential main groove while inclining with respect to the tire axial direction to one direction opposite to that of the axially outer shoulder oblique grooves so as to have their axially inner ends terminated within the crown land region,
   crown oblique grooves extending from one of the shoulder circumferential main grooves to the other while inclining with respect to the tire axial direction to one direction same as that of the axially outer shoulder oblique grooves,
wherein
   imaginary extensions of the axially outer shoulder oblique grooves are shifted in the tire circumferential direction from openings of the axially inner shoulder oblique grooves at the circumferential narrow groove so that the imaginary extensions do not overlap with the openings in the tire circumferential direction at the circumferential narrow groove,
   imaginary extensions of the axially inner shoulder oblique grooves are shifted in the tire circumferential direction from openings of the crown oblique grooves at the shoulder circumferential main groove so that the imaginary extensions do not overlap with the openings in the tire circumferential direction at the shoulder circumferential main groove,
   the imaginary extensions of the axially inner shoulder oblique grooves are shifted in the tire circumferential direction from openings of the axially outer shoulder oblique grooves at the circumferential narrow groove so that the imaginary extensions do not overlap with the openings in the tire circumferential direction at the circumferential narrow groove,
   imaginary extensions of the crown oblique grooves are shifted in the tire circumferential direction from openings of the axially inner shoulder oblique grooves at the shoulder circumferential main groove so that the imaginary extensions do not overlap with the openings in the tire circumferential direction at the shoulder circumferential main groove,
wherein
   each of the axially outer shoulder oblique grooves is a straight groove,
   the crown land region is provided with a center circumferential main groove extending circumferentially of the tire to axially divide each of the crown oblique grooves into two lateral groove parts,
   the center circumferential main groove is a zigzag groove composed of alternate lateral groove segments and longitudinal groove segments,
   each of the longitudinal groove segments extends straight between the circumferentially adjacent crown oblique grooves,
   each of the longitudinal groove segments has longitudinal groove walls extending at an angle ($\beta$) of not less than 60 degrees with respect to the tire axial direction, and
   each of the lateral groove segments has lateral groove walls extending at an angle ($\alpha$) of not more than 5 degrees with respect to the tire axial direction.

2. The pneumatic tire according to claim 1, wherein
   an angle ($\theta a$) of the axially outer shoulder oblique grooves with respect to the tire axial direction is 15 to 30 degrees,
   an angle ($\theta b$)) of the axially inner shoulder oblique grooves with respect to the tire axial direction is 15 to 30 degrees, and
   an angle ($\theta c$) of the crown oblique grooves with respect to the tire axial direction is 15 to 35 degrees.

3. The pneumatic tire according to claim 1, wherein the crown land region is provided with sipes inclined with respect to the tire axial direction to one direction opposite to that of the crown oblique grooves.

4. The pneumatic tire according to claim 1, wherein
the two lateral groove parts of each crown oblique groove are respectively connected to the axial ends of one of the lateral groove segments, whereby each of the crown oblique grooves extends from one of the shoulder circumferential main grooves to the other through the lateral groove segment.

5. The pneumatic tire according to claim 4, wherein the lateral groove walls have a length (L1) in the tire axial direction of 2% to 10% of the tread width (TW).

6. The pneumatic tire according to claim 5, wherein a ratio (W2/W1) of a groove width (W2) of the lateral groove segments to a groove width (W1) of the longitudinal groove segments is 0.8 to 2.0.

7. The pneumatic tire according to claim 5, wherein the longitudinal groove segments are inclined with respect to the tire axial direction to one direction same as that of the crown oblique grooves.

8. The pneumatic tire according to claim 1, wherein each of the shoulder circumferential main grooves is a straight groove.

9. The pneumatic tire according to claim 4, wherein
the crown land region is divided into crown blocks in two rows by the center circumferential main groove and the crown oblique grooves, and
the crown blocks are each provided with sipes inclined with respect to the tire axial direction to one direction opposite to that of the crown oblique grooves.

10. The pneumatic tire according to claim 4, wherein
the angle ($\beta$) of the longitudinal groove walls is not less than 75 degrees, and
an angle ($\theta c$) of the crown oblique grooves with respect to the tire axial direction is 15 to 35 degrees.

11. The pneumatic tire according to claim 1, wherein each of the axially inner shoulder oblique grooves is a straight groove.

12. The pneumatic tire according to claim 8, wherein each of the axially inner shoulder oblique grooves is a straight groove.

13. The pneumatic tire according to claim 12, wherein each of the circumferential narrow grooves is a straight groove having a width of less than 3 mm.

14. The pneumatic tire according to claim 1, wherein each of the circumferential narrow grooves is a straight groove having a width of less than 3 mm.

15. The pneumatic tire according to claim 8, wherein each of the circumferential narrow grooves is a straight groove having a width of less than 3 mm.

\* \* \* \* \*